UNITED STATES PATENT OFFICE.

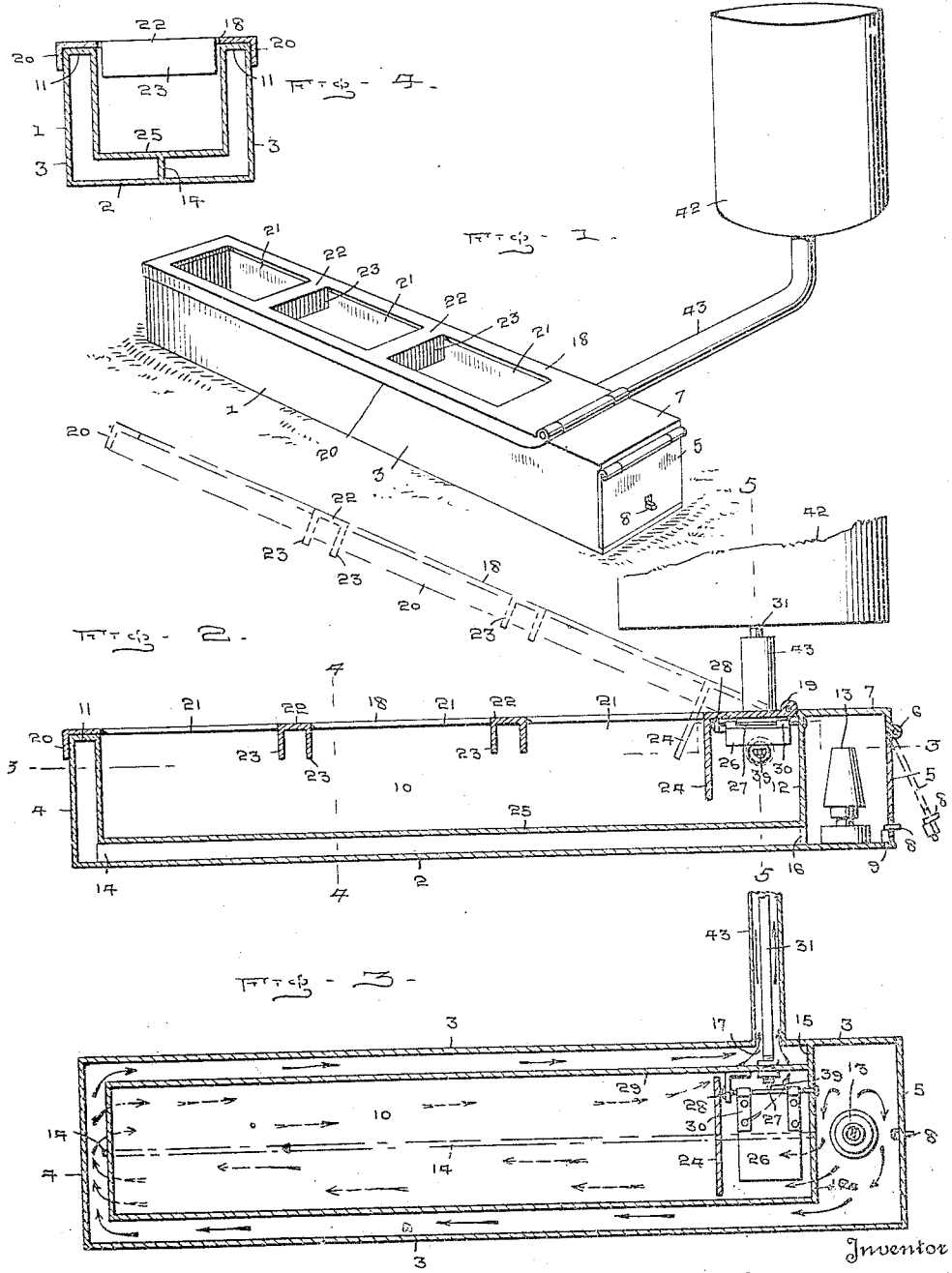

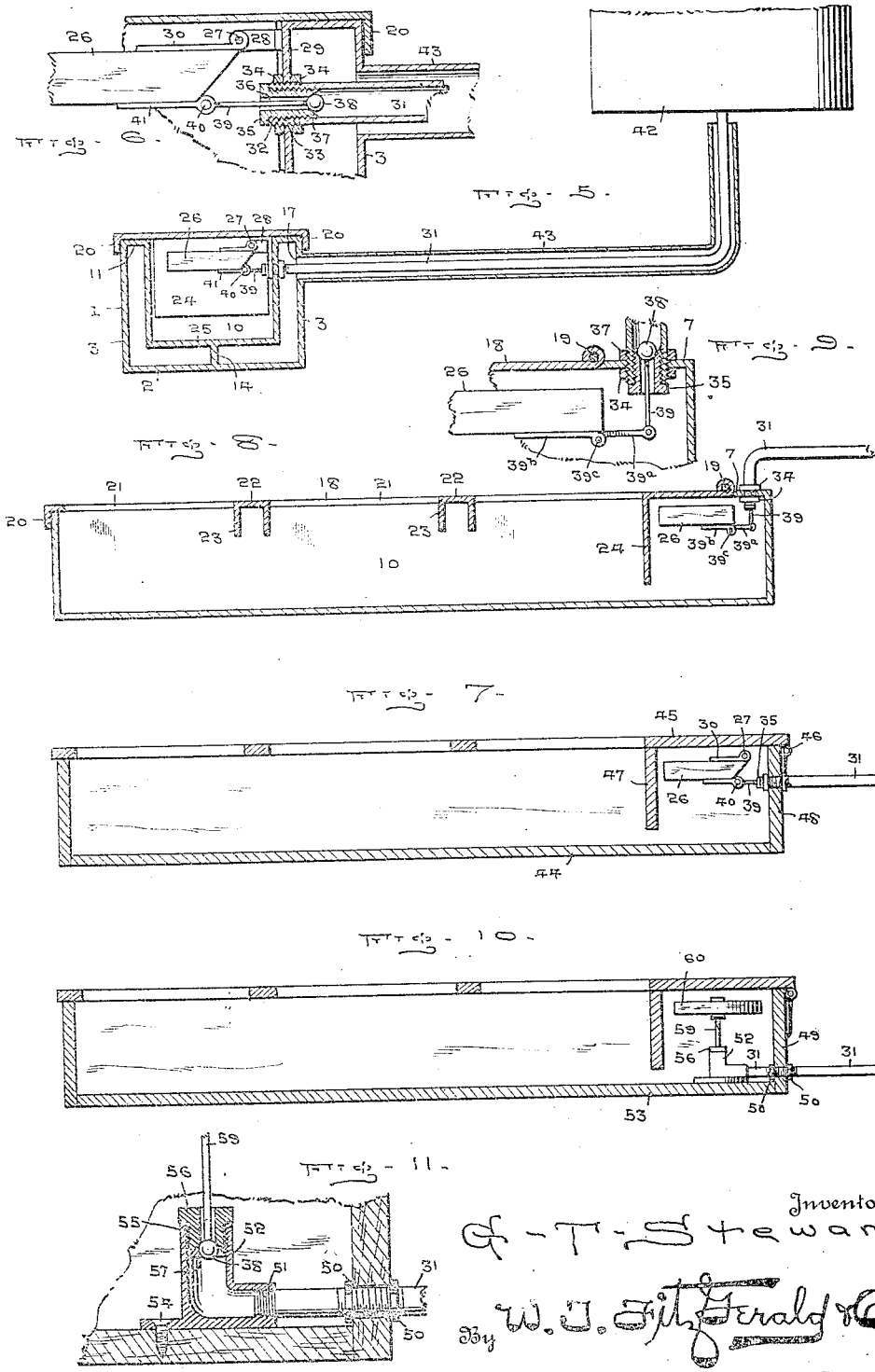
G. T. STEWART.
STOCK WATERING TROUGH.
APPLICATION FILED DEC. 14, 1916.
1,251,590.
Patented Jan. 1, 1918.
2 SHEETS—SHEET 2.

GEORGE T. STEWART, OF LARRABEE, IOWA.

STOCK-WATERING TROUGH.

1,251,590.   Specification of Letters Patent.   Patented Jan. 1, 1918.

Application filed December 14, 1916. Serial No. 136,967.

*To all whom it may concern:*

Be it known that I, GEORGE T. STEWART, a citizen of the United States, residing at Larrabee, in the county of Cherokee and State of Iowa, have invented certain new and useful Improvements in Stock-Watering Troughs; and I do hereby declare the following to be a full, clear, and exact description of the invention, such as will enable others skilled in the art to which it appertains to make and use the same.

This invention relates to troughs and more particularly to a stock watering trough designed for watering hogs and the like.

The principal object of the invention is to provide a watering trough embodying a trough casing in which is arranged a watering trough in spaced relation to the bottom and side walls of the trough casing so as to provide an air space surrounding the trough, and if desirable a heating medium may be arranged within this air space whereby the contents of the watering trough may be kept sufficiently warm to prevent it from freezing in cold weather.

Another object of the invention is the provision of a watering trough of the above stated character having a plurality of partitions positioned between the trough and trough casing in such a manner as to provide a circuitous passage extending from the heating medium forwardly and backwardly around said trough and then exhausting through a suitable vent opening formed in the trough casing.

A further object of the invention is to provide a water supply tank which is connected to the watering trough through the medium of a suitable pipe, an automatic cut off valve being arranged within the trough and connected to the terminal end of the supply pipe, said valve serving in conjunction with the water pressure of the supply tank to keep the watering trough filled with a supply of water.

A still further object of the invention is the provision of a float valve adapted to be normally closed when the trough is full of water through the medium of the buoyancy of the water and the pressure of the water from the supply tank, said valve opening as the water is taken from the trough, thus allowing the water to flow into the tank to a predetermined level whereupon the valve will be again closed.

A still further object of the invention is to surround the water supply pipe with a hot air exhaust pipe, which has one end attached to the trough casing over the vent opening thereof and the opposite end of the exhaust pipe terminating at a point adjacent the water supply tank, whereby the hot air as it is exhausted from the watering trough will circulate around the water supply pipe and exhaust beneath the supply tank, thus providing a means to prevent the water in the supply pipe and supply tank from freezing in cold weather.

With these and other objects in view, as will appear as the description proceeds, the invention comprises the various novel features of construction, combination and arrangement of parts as will be more fully described hereinafter and set forth with particularity in the appended claim.

Referring to the drawings,

Figure 1 is a perspective view of my improved stock watering trough with a water supply tank connected thereto.

Fig. 2 is a vertical longitudinal sectional view through the watering trough showing my preferred form with a heating medium arranged therein.

Fig. 3 is a sectional plan view taken on the line 3—3 of Fig. 2.

Fig. 4 is a vertical transverse sectional view taken on the line 4—4 of Fig. 2.

Fig. 5 is a vertical transverse sectional view taken on the line 5—5 of Fig. 2.

Fig. 6 is a fragmentary vertical sectional view taken on the same line as Fig. 5.

Fig. 7 is a vertical longitudinal sectional view of another form of watering trough, the outer casing being removed and showing the supply pipe extending in from the upper rear end of the trough.

Fig. 8 is another form of trough showing the supply pipe extending in from the top of the trough.

Fig. 9 is a fragmentary vertical longitudinal sectional view through the float valve thereof.

Fig. 10 is a vertical longitudinal sectional view through another form of watering trough, showing the supply pipe extending in at the bottom of one end of the trough, and Fig. 11 is a fragmentary vertical sectional view through the float valve thereof.

Similar characters of reference are used to denote like parts throughout the accompanying drawings and the following description.

Referring to the drawings the numeral 1 indicates an oblong trough casing which is provided with a bottom 2, side walls 3 and an end wall 4, the opposite end of the casing embodying a hinged door 5, which is hingedly connected at its upper end as at 6 to the outer end edge of the top wall 7. This door 5 carries a latch or bolt 8, which is designed to engage an aperture 9 formed in the bottom 2 of the casing, so as to hold the door in closed position.

Arranged within the trough casing is a watering trough 10, which as shown is of oblong construction and is arranged in spaced relation to the bottom side walls, and end walls so as to provide an air space entirely surrounding the trough. The upper marginal edges of the trough 10 are connected to the upper marginal edges of the trough casing through the medium of horizontally disposed strips 11, said strips serving to support the trough in spaced relation to and within the trough casing.

The rear end 12 of the trough 10 is arranged in spaced relation to the door 5 so as to provide a compartment in which is arranged a suitable heating medium 13, whereby the contents of the trough may be kept from freezing during cold weather.

Disposed between the bottom of the watering trough 10 and the bottom 2 of the trough casing is a partition 14 which extends from one end of the trough to the other and is disposed intermediate the opposite longitudinal edges thereof. The rear end wall 12 is extended across the air space to the side wall 3 of the trough casing as indicated by the numeral 15 and is designed to close the air space between the compartment containing the heating medium and the space between one of the side walls of the trough and the trough casing. The rear wall 12 is also extended downwardly to the bottom 2 as indicated by the numeral 16 and is designed to close communication between the compartment for the heating medium and the air space between the partition 14 and the opposite side wall 3 of the trough casing. The trough casing is provided in one side and at the upper portion thereof with a vent opening 17 through which the hot air from the heating medium exhausts. By the arrangement of the heating medium 13 as shown and the partition just mentioned, a circuitous passage is provided for the heated air and is designed to convey the same from the heating medium forwardly and rearwardly around the watering trough to the vent opening 17, which circulation of heated air will prevent the water that is contained within the trough from freezing in cold weather.

A cover 18 is hingedly connected to the top 7 as at 19 and is provided with depending marginal flanges 20 that are designed to embrace and extend over the sides of the trough casing. This cover 18 is provided with a series of openings 21 which are separated by transversely extending cross bars 22, these cross bars being provided at their opposite edges with transversely extending guard flanges 23. The rear end of the opening 21 adjacent the hinge 19 is provided with a depending flange or baffle plate 24, which is formed integral with the rear end portion of the cover. This baffle plate is designed to extend downwardly into close proximity to the bottom 25 of the watering trough 10 so as to effectively protect the float valve arranged in the rear end of the trough. By the provision of these guard flanges 23 the stock when feeding from the trough will be held effectively segregated.

A substantially rectangular float valve 26 is hingedly mounted at one end upon a longitudinally extending hinge rod 27, which is mounted at one end in the rear wall 12 and at its opposite end in a bracket 28 mounted upon the inner side wall 29 of the trough 10. As shown the hinges 30 that are used to hinge the float valve 26 to the hinge rod 27 are arranged upon the upper surface of the float valve.

A supply pipe 31 has a threaded end 32 that projects through an aperture 33 in the side wall 29 and is held therein through the medium of clamping nuts 34 that are arranged on opposite sides of the wall 29 and are designed to form a water tight joint between the wall and the supply pipe. The inner end of this supply pipe 31 is internally threaded and designed to receive a screw valve plug 35 which is provided centrally with a longitudinally extending opening 36, the inner end of the plug being provided with an inwardly inclined or baffle valve seat 37 upon which is designed to rest a ball valve 38 connected to the outer end of a valve rod 39 which projects inwardly through the opening 36. The inner end of this valve rod 39 is hingedly connected as at 40 to a hinge 41 secured to the underneath surface of the float valve 26.

As clearly shown the supply pipe 31 extends outwardly through the vent opening 17 of the trough casing a suitable distance to a water supply tank 42, which in this instance is arranged in a position slightly above the watering trough so as to produce the desired pressure within the supply pipe.

A hot air exhaust pipe 43 surrounds the supply pipe 31 and has one end attached to the side wall 3 over the vent opening 17, and the opposite end of the hot air exhaust pipe terminates at a point adjacent the supply tank 42. From this arrangement it will be apparent that as the hot air is exhausted through the vent opening 17 it will pass outwardly through the exhaust pipe 43 around the supply pipe 31 and exhaust immediately beneath the supply tank 42, this heated air serving to prevent water in the tank and the supply pipe 31 from freezing in cold weather.

In the operation of the device the water will flow from the supply tank 42 through the supply pipe 31 into the watering trough 10 through the valve arranged therein, until the water has reached a predetermined height or level whereupon the buoyancy of the water in connection with the pressure of the water from the supply tank will float the float 26 upwardly and move the valve head 38 into engagement with the valve seat 37 and thus shut off the supply of water when the water in the trough has reached the predetermined level. As the water is taken from the trough, the float 26 will be allowed to descend, in view of the fact that the pressure of the water in the supply tank is not quite sufficient to hold the valve 38 up against its seat 37, therefore water will again flow into the tank until it has reached the predetermined height and the valve again closed.

In Fig. 7 will be seen another form of watering trough in which the trough is made of wood and the trough casing omitted, this not being necessary in a warm climate. In this form the trough 44 is provided with a cover 45 hingedly connected thereto as at 46 and is of substantially the same construction as the cover 18, it being also provided with a depending baffle plate 47. In this form the supply pipe 31 is extended into the watering trough through the rear end 48 and has attached to its inner end the same construction of float and valve arrangement as shown and described in connection with my preferred form, and particularly shown in Fig. 6 of the drawings, therefore the same reference numerals will suffice for this form of valve arrangement.

In Figs. 8 and 9 will be seen another form of watering trough similar to that shown in Fig. 7 with the exception that the trough in this instance is formed of metal as is the preferred form. In this form the supply pipe 31 extends in from the top 7 of the trough and is provided with the same kind of a valve arrangement as heretofore described and shown in the drawings, therefore the same reference numerals will suffice for a description of this form of valve. The valve rod 39 in this instance is pivotally connected to a projection 39ª extending rearwardly from the hinge member 39ᵇ which is attached to the underneath surface of the float 26. The hinge member 39ᵇ is pivotally mounted upon a hinge rod 39ᶜ that extends transversely of and is secured to the side walls of the trough. As the float 26 is moved upwardly under the buoyancy of the water, the extension 39ª will move downwardly pulling the valve rod 39 also downwardly thus closing the valve from a further admission of water into the tank. This form of tank also has the outer casing omitted as a dead air space provided with a heating medium is not necessary.

In Fig. 10 will be seen a still further modified form of my invention, in which the watering trough is made of wood, like the one shown in Fig. 7, and is provided with a slightly different construction of float valve, but embodying the same principle. The supply pipe 31 in this instance extends in through the rear end 49 of the trough and at the bottom portion thereof and is securely attached to the end through the medium of retaining nuts 50.

The inner end of the supply pipe 31 is threadedly connected as at 51 to one end of an angular valve casing 52 that is secured to the bottom 43 by screws 54 or other suitable fastening means. As shown this valve casing 52 is provided with an upwardly extending portion 55 and is internally threaded to receive a valve plug 56 which is identical in construction with the valve plug 35 hereinbefore described. This plug is provided with a valve seat 57 against which rests the ball valve 58 which may be of rubber or any desired construction and is attached to the valve rod 59, said valve rod extending upwardly and attached to a suitable float 60 disposed in the upper portion of the trough. The action of this valve is identical with those before described, therefore it is not thought necessary to give a detail description thereof.

What I claim is:—

A water trough comprising an elongated trough casing having a vent opening in one of its vertical walls, an elongated water trough having an open upper end positioned within and in spaced relation to the bottom, side and end walls of the casing, means connecting the upper circumferential edge of the water trough to the upper circumferential edge of said casing to close the air space between said trough and casing, one end of said trough being spaced from the adjacent end of the casing to provide a compartment, a heating medium arranged within said compartment, a door arranged in the casing whereby access may be had to said compartment, and vertical partitions arranged between the bottoms and sides of the trough and the trough casing to form a circuitous air passage from said compartment around said trough to the vent opening thereof.

In testimony whereof I have signed my name to this specification in the presence of two subscribing witnesses.

GEORGE T. STEWART.

Witnesses:
L. F. HARRIS,
I. JACOBSEN.